(12) United States Patent
Maeda

(10) Patent No.: US 7,666,346 B2
(45) Date of Patent: Feb. 23, 2010

(54) STEEL-MEMBER MANUFACTURING FACILITY, THIN BEARING-MEMBER AND THRUST BEARING

(75) Inventor: Kikuo Maeda, Kuwana (JP)

(73) Assignee: NTN Corporation, Osaka (JP)

( * ) Notice: Subject to any disclaimer, the term of this patent is extended or adjusted under 35 U.S.C. 154(b) by 387 days.

(21) Appl. No.: 11/396,650

(22) Filed: Apr. 4, 2006

(65) Prior Publication Data

US 2006/0226584 A1    Oct. 12, 2006

(30) Foreign Application Priority Data

Apr. 6, 2005    (JP) .............................. 2005-110123

(51) Int. Cl.
*C21D 1/62* (2006.01)
(52) U.S. Cl. ...................... 266/99; 266/142; 266/260
(58) Field of Classification Search ................... 266/78, 266/99, 100, 142, 149, 259, 260
See application file for complete search history.

(56) References Cited

U.S. PATENT DOCUMENTS

| | | | | |
|---|---|---|---|---|
| 2,655,588 A | * | 10/1953 | Wadhams | 219/653 |
| 4,042,285 A | * | 8/1977 | Dorsch | 384/621 |
| 5,474,390 A | * | 12/1995 | Rhoads | 384/623 |
| 5,918,987 A | * | 7/1999 | Sundquist et al. | 384/622 |
| 6,328,829 B1 | * | 12/2001 | Kato et al. | 266/260 |

FOREIGN PATENT DOCUMENTS

| | | |
|---|---|---|
| JP | 5-33060 | 2/1993 |
| JP | 5-263125 A | 10/1993 |
| JP | 7-157822 A | 6/1995 |
| JP | 9-31532 A | 2/1997 |
| JP | 9-118917 A | 5/1997 |
| JP | 11-31579 A | 2/1999 |
| JP | 2003-231915 A | 8/2003 |
| JP | 2004-177159 A | 6/2004 |

* cited by examiner

*Primary Examiner*—Scott Kastler
(74) *Attorney, Agent, or Firm*—McDermott Will & Emery LLP

(57) ABSTRACT

A steel-member manufacturing facility that can suppress distortion occurring in a quenching process while preventing increase in manufacturing cost includes: a die-cutting apparatus to form a washer; a high-frequency induction heating apparatus for quenching purpose as well as a mold-constraining cooling apparatus that heat the washer as formed and thereafter cool the washer so as to quench-harden the washer; and a high-frequency induction heating apparatus for tempering purpose that heats the quench-hardened washer so as to temper the washer. The high-frequency induction heating apparatus for quenching purpose can heat the washer by induction heating to the temperature of at least $A_{c1}$ point. The mold-constraining cooling apparatus uses a mold to constrain the heated washer while using the mold as a cooling member, thereby cooling the washer to the temperature of at most $M_s$ point.

3 Claims, 3 Drawing Sheets

STEEL-MEMBER MANUFACTURING FACILITY, THIN BEARING-MEMBER AND THRUST BEARING

BACKGROUND OF THE INVENTION

1. Field of the Invention

The present invention relates to a manufacturing facility for a steel member, a thin bearing-member namely a thin member for a bearing, and a thrust bearing. More specifically, the invention relates to a steel-member manufacturing facility that can easily be automated, a thin bearing-member that is manufactured by the steel-member manufacturing facility, and a thrust bearing having the thin bearing-member.

2. Description of the Background Art

Generally, for a thin bearing ring/washer which is a steel member, such a material as SPCC (JIS G 3141 standard) that is a low-carbon steel or SCM415 (JIS G 4053 standard) is employed. These materials are formed into a required shape and thereafter subjected to a short-term carburizing process and subsequently to a quenching process. Accordingly, the materials are quench-hardened, namely hardened by quenching to ensure hardness of a level required for the ring/washer. In some cases, such a high-carbon steel material as SUJ2 (JIS G 4805 standard) or SAE1070 is also employed as a material for the ring/washer. In this case, these materials are formed into a required shape, thereafter heated in a controlled atmospheric furnace and subsequently rapidly cooled and thereby quench-hardened. In this way, hardness of a level required for the ring/washer is ensured.

In terms of efficient operation of the heat treatment furnace and the quenching apparatus, the above-described quench-hardening is performed through batch treatment under which heat treatment is performed lot by lot comprised of an appropriate number of steel members (rings/washers).

In some cases, for the quench-hardening of the ring/washer, induction hardening is also employed using induction heating to heat and quench the ring/washer. The induction hardening can extremely shorten the process time as compared with quenching using a controlled atmospheric furnace for example. Thus, the induction hardening can contribute to improvement of production efficiency especially in the case where one lot includes a relatively small number of steel members.

In recent years, such a product as automobile using a bearing having the thin bearing ring/washer has been being enhanced in performance and functionality. Under this situation, the level of characteristics required for the bearing is becoming higher. Further, in terms of improvement of price competitiveness, cost reduction is also an important object to be achieved.

Under the circumstances, a method of determining whether or not induction hardening has normally been performed (see for example Japanese Patent Laying-Open Nos. 11-031579 and 09-118917), a method of efficiently performing induction hardening (see Japanese Patent Laying-Open Nos. 09-031532 and 05-263125) and an apparatus for measuring the hardening depth of an induction-hardened member (see Japanese Patent Laying-Open No. 2004-177159) for example have been proposed.

Further, the thin bearing ring/washer used for the bearing is likely to be distorted while quenched in the manufacturing process. In the case where the ring/washer is distorted to a considerable degree, the bearing having the distorted ring/washer has a shortened lifetime.

Then, as a method of suppressing distortion of a steel material while being quenched, a method has been proposed according to which the scale thickness on the surface of the steel plate while the steel plate is being press-quenched is set to 10 μm or less. Accordingly, a component formed to have superior shape precision can be manufactured (see Japanese Patent Laying-Open No. 2003-231915). Further, a method has been proposed, regarding the press quenching of a steel material, according to which the steel material in the state constrained, namely prevented from distorting, by molds is immersed in a cooling fluid (see Japanese Patent Laying-Open No. 07-157822). Accordingly, distortion and bending occurring in the quenching process can be reduced even for a high-hardness steel material. Furthermore, a method has been proposed according to which the outer periphery as well as the end surfaces in the width direction of a thin ring are constrained by means of a collet (constraining member) to perform quenching. Accordingly, distortion occurring in the quenching process is suppressed (see Japanese Patent Laying-Open No. 05-033060).

The above-described measures to make improvements concerning the induction hardening contribute to improvements in quality and reduction in cost of the steel member. However, since a conventional quenching apparatus including an induction hardening apparatus frequently uses oil or water for example as a cooling medium for quenching, other apparatuses for processing and testing are installed in many cases at locations remote from the quenching apparatus for the purpose of avoiding influences of the oil or water. Consequently, there arises a necessity to convey the steel member between the quenching apparatus and other apparatuses, resulting in deterioration in production efficiency and increase in manufacturing cost. Moreover, the steel member, especially the one before quench-hardened, is likely to be deeply flawed while the steel member is being conveyed, due to low hardness of the steel member, which could cause defective products.

In addition, even in the case where the above-described method of suppressing distortion is applied to a thin bearing ring/washer to produce a bearing, the resultant bearing is not necessarily sufficiently long in lifetime, in consideration of the recent demands for higher-level characteristics.

SUMMARY OF THE INVENTION

An object of the present invention is therefore to provide a steel-member manufacturing facility that can suppress distortion occurring in a quenching process, while preventing increase in manufacturing cost. Another object of the present invention is to provide a thin bearing-member with distortion suppressed that occurs in a quenching process, while preventing increase in manufacturing cost. Still another object of the present invention is to provide a long-lifetime and low-cost thrust bearing.

According to the present invention, a manufacturing facility for steel members is a steel-member manufacturing facility including: a die-cutting apparatus die-cutting a steel plate to form a steel member; a quench-hardening apparatus heating the steel member formed by means of the die-cutting apparatus to a temperature of at least $A_{c1}$ point and thereafter cooling the steel member to a temperature of at most $M_s$ point so as to quench-harden the steel member; and a tempering apparatus heating the steel member quench-hardened by means of the quench-hardening apparatus to a temperature of at most $A_{c1}$ point so as to temper the steel member. The quench-hardening apparatus includes an induction heating apparatus for quenching purpose that induction-heats the steel member formed by means of the die-cutting apparatus to the temperature of at least $A_{c1}$ point, and a mold-constraining cooling apparatus, while using a mold for constraining the steel member heated to the temperature of at least $A_{c1}$ point by means of the induction-heating apparatus for quenching purpose, using the mold as a cooling member for removing heat from the steel member, so as to cool the steel member to the temperature of at most $M_s$ point. The tempering apparatus includes a heating apparatus for tempering purpose that heats the steel member quench-hardened by means of the quench-hardening apparatus to the temperature of at most $A_{c1}$ point.

In the steel-member manufacturing facility of the present invention, the steel member is cooled while being constrained by means of the mold. Thus, distortion occurring in the quenching process can be suppressed. Further, regarding the cooling of the steel member, the mold is used as a cooling member for removing heat from the steel member and the steel member is accordingly cooled from the temperature of at least $A_{c1}$ point to the temperature of at most $M_s$ point. Therefore, it is unnecessary to use such a cooling medium as oil or water and thus the working environment can be kept clean. Accordingly, the quench-hardening apparatus can be placed in the vicinity of other apparatuses that are components of the steel-member manufacturing facility, which can contribute to improvement in production efficiency.

It is noted that "$A_{c1}$ point" refers to a point corresponding to the temperature at which continuously heated steel starts to transform from ferrite to austenite. Further, "$M_s$ point" refers to a point corresponding to the temperature at which the steel transforming to austenite starts to transform to martensite while being cooled.

Preferably, the steel-member manufacturing facility further includes a steel member moving apparatus moving the steel member within the steel-member manufacturing facility.

Thus, such components of the steel-member manufacturing facility as the quench-hardening apparatus and tempering apparatus can be linked to each other to improve the production efficiency of the steel member.

Preferably, in the steel-member manufacturing facility, the heating apparatus for tempering purpose has the function of heating the steel member by induction heating.

Thus, the rapid heating of the steel member by the induction heating can be used for tempering. Accordingly, the time for raising the temperature for the purpose of tempering can be shortened to further improve the production efficiency of the steel member.

Preferably, the steel-member manufacturing facility further includes an automatic material-property testing apparatus automatically testing a material property of the steel member at least one of a point in time after tempering is performed by the tempering apparatus and a point in time after quench-hardening is performed by the quench-hardening apparatus and before the tempering is performed by the tempering apparatus.

As discussed above, in the steel-member manufacturing facility of the present invention, the cooling step for quenching can be performed without using such a cooling medium as oil or water. Since it is thus unnecessary to bring the steel member into contact with oil or water serving as a cooling medium and the automatic material-property testing apparatus is further included, the automatic material-property testing apparatus can be used to determine the material property without providing the steps of cleaning and drying the steel member. Further, since the steel-member manufacturing facility of the present invention includes the induction-heating apparatus for quenching purpose, steel members can be heat-treated one by one without considerable deterioration in processing efficiency. Thus, the automatic material-property determination can successively be made on the heat-treated steel members, so that the material-property determination can smoothly be made on all steel members. With the above-described characteristics, the steel-member manufacturing facility of the present invention can be used to manufacture the steel member through the process including the steps from the quench-hardening step to the material-property determination step for quality assurance that are performed smoothly without generating in-process workpieces in any of the process steps, and the process can readily be automated. Therefore, the quality of each steel member can be assured while the manufacturing cost of the steel member is kept low.

It is noted that the automatic material-property determining apparatus may any as long as the apparatus can evaluate a characteristic correlated with the hardness or microstructure for example that is a material property of the steel member caused to change by the quench-hardening step. For example, the apparatus may be any of micro hardness tester, material-property determining machine (ultrasonic hardness tester), eddy-current flaw detecting apparatus, thermoelectromotive foreign-material detector, Barkhausen noise measuring apparatus, and x-ray diffraction apparatus. Here, the automatic material-property determining apparatus can preferably make an evaluation in a short period of time. Specifically, since the quench-hardening step by means of the induction heating is completed in several seconds to several dozen seconds, it is desirable that the evaluation is completed in a shorter time for the purpose of smoothly making the material-property determination by one automatic material-property determining apparatus. The eddy-current flaw detecting apparatus and the material-property determining machine (ultrasonic hardness tester) satisfy this condition. Further, among x-ray diffraction apparatuses, those with high output also satisfy this condition.

Preferably, the steel-member manufacturing facility further includes an automatic appearance testing apparatus automatically testing the appearance of the steel member at least one of a point in time after tempering is performed by the tempering apparatus and a point in time after quench-hardening is performed by the quench-hardening apparatus and before the tempering is performed by the tempering apparatus.

Thus, not only such internal qualities as hardness and microstructure resultant from the quench-hardening step but also qualities appearing on the outside like flaws in the surface of the steel member can automatically be tested.

It is noted that, as the automatic appearance testing apparatus, an image analysis testing apparatus for example can be employed that analyzes an image taken from a camera for example to find flaws or the like in the surface of the steel member.

Preferably, in the steel-member manufacturing facility, the automatic material-property testing apparatus has the function of conducting a nondestructive test for testing the material property without destructing the steel member. It is apparently seen that, if the manufacturing process includes any step in which the steel member could be cut for example to be broken, the steel member could not be a proper product. Even minute plastic deformation (minute indentation for example) could adversely influence the characteristics of a product. Further, even if any deformation occurs to the extent that does not substantially cause a problem in the function of the steel member in consideration of the intended use of the steel member, such deformation could be a problem for a product whose aesthetic appearance is important. Therefore, preferably the apparatus determines the material property without causing plastic deformation. Thus, the above-described characteristics of the present invention enable the material-property to be tested in the manufacturing process of the steel member without deteriorating the function and aesthetic appearance of the product. It is noted that the eddy-current flaw detecting apparatus, material-property determining machine (ultrasonic hardness tester) and x-ray diffraction apparatus are each the automatic. material-property determining apparatus satisfying the aforementioned condition.

Preferably, in the steel-member manufacturing facility, the material property tested by the automatic material-property testing apparatus includes a material property correlated with the hardness of the steel member. Thus, the steel member can be manufactured with the guaranteed hardness that is one of the most important properties of those of the steel member.

It is desirable that the material property to be determined has a high correlation with the hardness at and around a threshold for determining whether or not the hardness is acceptable, and that the material property to be determined provides fine or precise measurements of the hardness. For example, in the case where the steel member is used as a member of a bearing, it is desirable that a difference in hardness of approximately 2 HRC is clearly detected when the hardness is in and around the range of 55 HRC to 65 HRC (Rockwell hardness) that are thresholds for determining whether or not the hardness is acceptable.

Preferably, the steel-member manufacturing facility further includes a cleaning apparatus cleaning the steel member, formed by the die-cutting apparatus, before the heating is performed by the induction heating apparatus for quenching purpose, so as to remove an attached matter attached to a surface of the steel member, and a drying apparatus drying the steel member, before the heating is performed by the induction heating apparatus for quenching purpose, so as to remove a cleaning fluid attached to the steel member while the cleaning apparatus performs cleaning.

Thus, the cleaning apparatus can be used to remove such attached matters as rust-inhibiting oil, lubricating oil and chippings that are attached to the surface of the steel member in the die-cutting step by the die-cutting apparatus for forming the steel member, the drying apparatus can be used to remove a cleaning fluid attached to the steel member and, in this state, the steel member can be manufactured. Accordingly, the attached matters can be prevented from adversely influencing the manufacture of the steel member, and contamination of the steel-member manufacturing facility due to the attached matters can be prevented.

A thin bearing-member according to the present invention is manufactured using the above-discussed steel-member manufacturing facility. The thin bearing-member of the present invention can be provided that has small distortion generated in the quenching step and that is low in manufacturing cost. It is noted that the thin bearing-member refers to a bearing member whose thickest portion is at most 3 mm in thickness.

The thin bearing-member can be used as a washer of a thrust bearing. For the thrust bearing, the precision of the external shape of the washer is an important characteristic that influences the lifetime of the bearing. As described above, since the thin bearing-member of the present invention is small in distortion in the quenching step and the manufacturing cost of the member is kept low, the thin bearing-member is suitable as a washer of a thrust bearing.

A thrust bearing according to the present invention includes a washer that is the above-described thin bearing-member and rolling elements arranged on a raceway surface of the washer.

The thrust bearing of the present invention has the washer that is small in distortion generated in heat treatment and low in manufacturing cost as described above, and thus the long-lifetime and low-cost thrust bearing can be provided. It is noted here that the raceway surface refers to a washer's surface portion where the rolling elements roll.

As clearly seen from the foregoing description, the steel-member manufacturing facility can be provided according to the present invention that can suppress distortion occurring in a quenching process while the manufacturing cost is prevented from increasing. Further, the thin bearing-member can be provided according to the present invention for which distortion occurring in a quenching process is suppressed while the manufacturing cost is prevented from increasing. Furthermore, the thrust bearing can be provided according to the present invention that is long in lifetime and low in cost.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
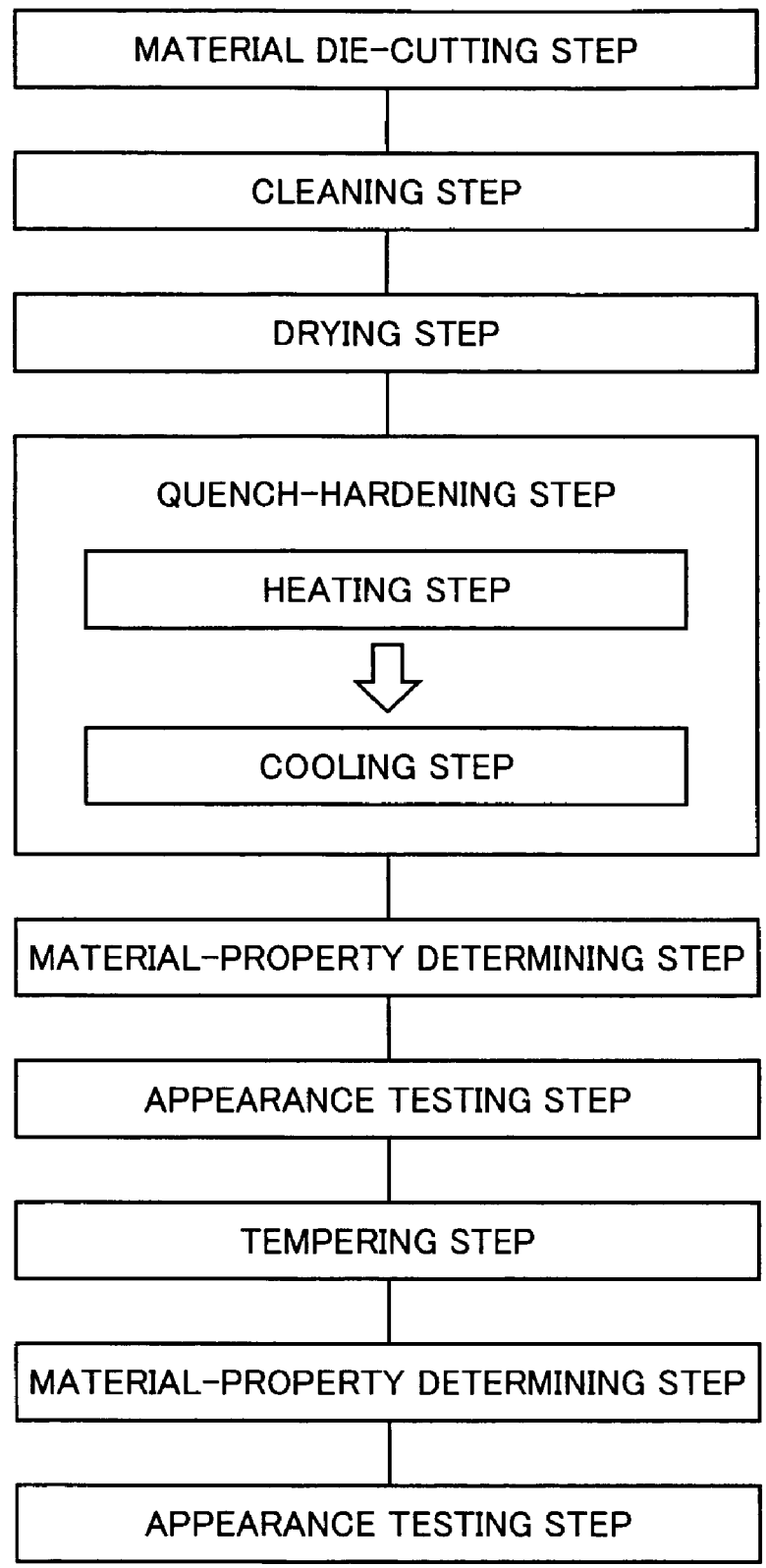
FIG. 1 schematically shows a method of manufacturing a thin bearing-member.

An embodiment of the present invention is hereinafter described in connection with the drawings. It is noted that identical or corresponding components in the drawings are denoted by the same reference numeral/character and a description thereof is not repeated.

In the following, with reference to FIGS. 1 and 2, an outline is given of a method of manufacturing a washer as a thin bearing-member of a thrust bearing as well as a thrust bearing, using a steel-member manufacturing facility in accordance with the embodiment of the present invention.

Figure 2:
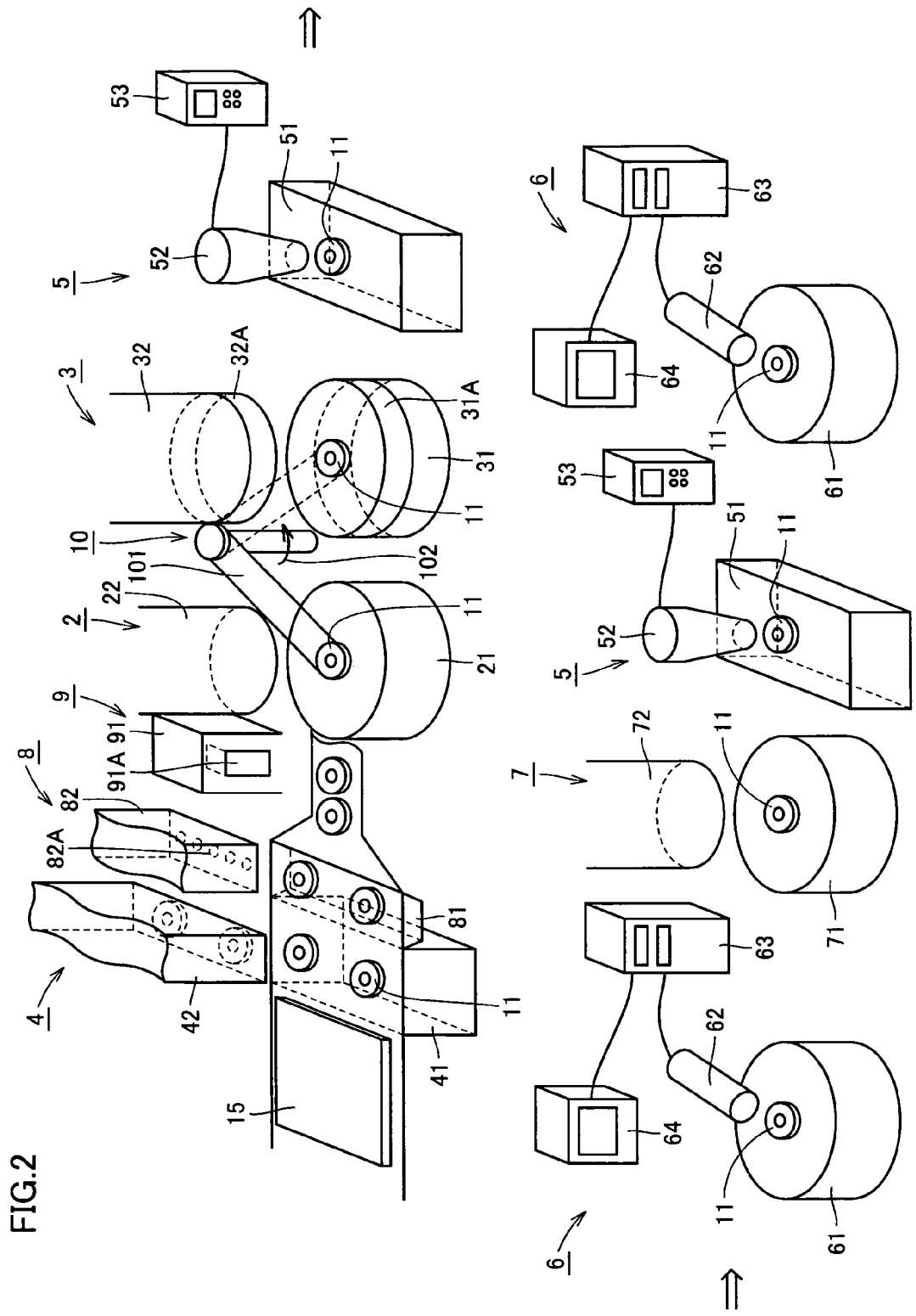
FIG. 2 schematically shows a manufacturing facility for steel members.

As shown in FIG. 1, a material die-cutting step is first performed by die-cutting a steel plate to form a washer that serves as a thin bearing-member which is a steel member. Specifically, as shown in FIG. 2, a steel plate 15 is moved by a moving apparatus (not shown) to the position where the steel plate can be die-cut by a die-cutting apparatus 4 having an upper die-cutting mold 42 and a lower die-cutting mold 41. Then, steel plate 15, which is sandwiched between upper die-cutting mold 42 and lower die-cutting mold 41, is die-cut to form a washer 11.

Next, as shown in FIG. 1, a cleaning step is performed for removing an attached matter attached to the surface of washer 11. Specifically, as shown in FIG. 2, washer 11 as formed is moved by a moving apparatus (not shown) to the position where the washer can be cleaned by a shower cleaning apparatus 8 having a shower unit 82 and a cleaning fluid tank 81 to serve as the cleaning apparatus. Then, from a cleaning-fluid outlet 82A of shower unit 82 that is placed to face cleaning-fluid tank 81, a cleaning fluid is ejected toward washer 11 to clean washer 11.

Subsequently, as shown in FIG. 1, a drying step is performed for drying washer 11 so as to remove the cleaning fluid attached to washer 11 in the cleaning step. Specifically, as shown in FIG. 2, washer 11 as cleaned is moved by a moving apparatus (not shown) to the position where the washer can be dried by a hot-air drying apparatus 9 having a hot-air ejection unit 91 to serve as the drying apparatus. Then, from an ejection outlet 91A formed in hot-air ejection unit 91, hot air is ejected toward washer 11 to dry washer 11.

Following this, as shown in FIG. 1, a quench-hardening step is performed that includes a heating step of heating washer 11 to a temperature of at least $A_{c1}$ point and a cooling step of cooling washer 11, which is heated to the temperature of at least $A_{c1}$ point in the heating step, to a temperature of at most $M_s$ point. Specifically, as shown in FIG. 2, washer 11 as dried is moved by a moving apparatus (not shown) to the position where the washer can be heated by a high-frequency induction heating apparatus for quenching purpose 2 that has a quenching induction coil 22 and a quenching rotary table 21 to serve as the induction heating apparatus for quenching purpose. Then, high-frequency current is flown through quenching induction coil 22 to heat washer 11 to the temperature of $A_{c1}$ point or higher. Further, washer 11 as heated to the temperature of $A_{c1}$ point or higher is held by an arm unit 101 of a moving apparatus 10 that serves as a steel member moving apparatus, and arm unit 101 is pivoted in the direction indicated by an arm-unit pivot direction 102 so as to move the washer to the position where the washer can be cooled by a mold-constraining cooling apparatus 3 having an upper constraining mold 32 and a lower constraining mold 31. Thereafter, while washer 11 is sandwiched and constrained between an upper-constraining-mold constraining unit 32A of upper constraining mold 32 and a lower-constraining-mold constraining unit 31A of lower constraining mold 31, upper constraining mold 32 and lower constraining mold 31 are used as a cooling member for removing heat from washer 11 so as to cool washer 11 at the temperature of at least $A_{c1}$ point to the temperature of at most $M_s$ point. Accordingly, washer 11 is quench-hardened.

Subsequently, as shown in FIG. 1, a material-property determining step of determining a material property of washer 11 as quench-hardened is performed. Specifically, as shown in FIG. 2, washer 11 as quench-hardened is moved by a moving apparatus (not shown) to the position where the hardness of the washer can be measured by an ultrasonic hardness tester 5 having a hardness-measurement holding table 51, an ultrasonic hardness measuring unit 52 and a measurement control analysis unit 53 connected to ultrasonic hardness measuring unit 52 to serve as the automatic material-property determining apparatus. Then, from ultrasonic hardness measuring unit 52, ultrasonic wave is automatically emitted toward washer 11 and ultrasonic wave as reflected is measured by ultrasonic hardness measuring unit 52. The measured ultrasonic wave is thereafter analyzed by measurement control analysis apparatus 53 to automatically measure the hardness of the surface, especially the hardness of the raceway surface of washer 11. Since this material-property determining step uses the ultrasonic wave for measuring the hardness, washer 11 is not plastically deformed. In other words, ultrasonic hardness meter 5 serving as the automatic material-property determining apparatus has the function of performing nondestructive testing to determine the material property without breaking washer 11.

Subsequently, as shown in FIG. 1, on washer 11 whose material property has been determined, an appearance test is conducted for testing the appearance of washer 11. Specifically, as shown in FIG. 2, washer 11 whose material property has been determined is moved by a moving apparatus (not shown) to the position where the washer can undergo the appearance test by an image processing apparatus 6 having an appearance-test holding table 61, a camera 62, a monitor 64 and an image processing control unit 63 connected to camera 62 and monitor 64 to serve as the automatic appearing testing apparatus. Then, an image of washer 11 is automatically taken by camera 62 and the image as taken is provided into and analyzed by image processing control unit 63 to automatically test the appearance of washer 11.

Subsequently, as shown in FIG. 1, on washer 11 whose appearance has been tested, a tempering step is performed to heat washer 11 to a temperature of at most $A_{c1}$ point. Specifically, as shown in FIG. 2, washer 11 whose appearance has been tested is moved by a moving apparatus (not shown) to the position where the washer can be heated by a high-frequency induction heating apparatus for tempering purpose 7 having a tempering induction coil 72 and a tempering rotary table 71 to serve as the induction heating apparatus for tempering purpose. Then, high-frequency current is flown through tempering induction coil 72 to heat washer 11 to the temperature of at most $A_{c1}$ point, thereafter cooled and thereby tempered.

Subsequently, as shown in FIG. 1, on washer 11 as tempered, a material-property determining step and an appearance testing step are performed. The material-property determining step and the appearance testing step are similar to the steps performed after the quench-hardening step. Specifically, as shown in FIG. 2, washer 11 as tempered is moved by a moving apparatus (not shown) to the position where the hardness test by ultrasonic hardness tester 5 can be conducted and then undergoes the hardness test, and the washer is further moved by a moving apparatus (not shown) to the position where the appearance test by image processing apparatus 6 can be conducted and then undergoes the appearance test.

Through the process steps discussed above, washer 11 using a steel plate as a material and then quenched and tempered is manufactured. Any washers that do not satisfy predetermined standards are discarded by the material-property determination and the appearance test. Accordingly, the quality in terms of the hardness and the appearance of all washers 11 is guaranteed.

Further, by combining washer 11 as described above with rolling elements provided on the raceway surface of washer 11, a thin thrust roller bearing that is a thrust bearing in the present embodiment can be manufactured.

Figure 5:
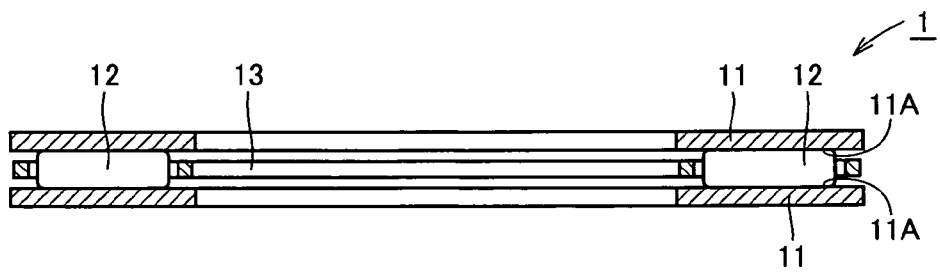
FIG. 5 is a schematic cross sectional view showing a thrust bearing having washers as thin bearing-members.

Referring to FIG. 5, the thin thrust bearing in the present embodiment has the structure as described below. As shown in FIG. 5, thin thrust bearing 1 includes for example a pair of washers 11, 11, rollers 12 that are a plurality of rolling elements, and an annular cage 13. Rollers 12 are arranged between the paired washers 11, 11 and in contact with respective raceway surfaces 11A, 11A of washers 11, 11. Further, by cage 13, rollers 12 are arranged in the circumferential direction at predetermined pitches and held to freely roll. Accordingly, washers 11, 11 can rotate relative to each other.

Figure 3:
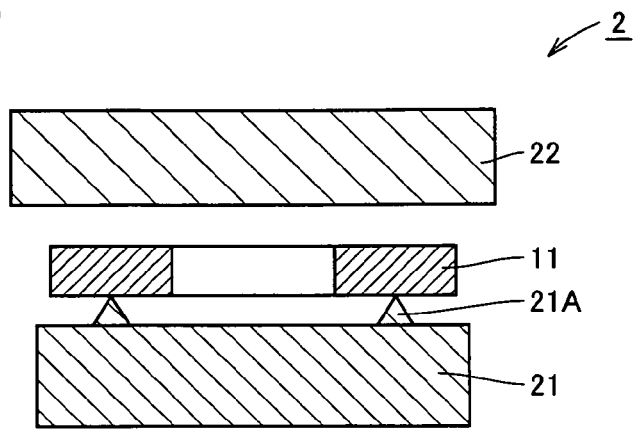
FIG. 3 is a schematic cross-sectional view showing a high-frequency induction heating apparatus for quenching purpose that serves as an induction heating apparatus for quenching purpose included in the manufacturing facility for steel members in FIG. 2.
Figure 4:
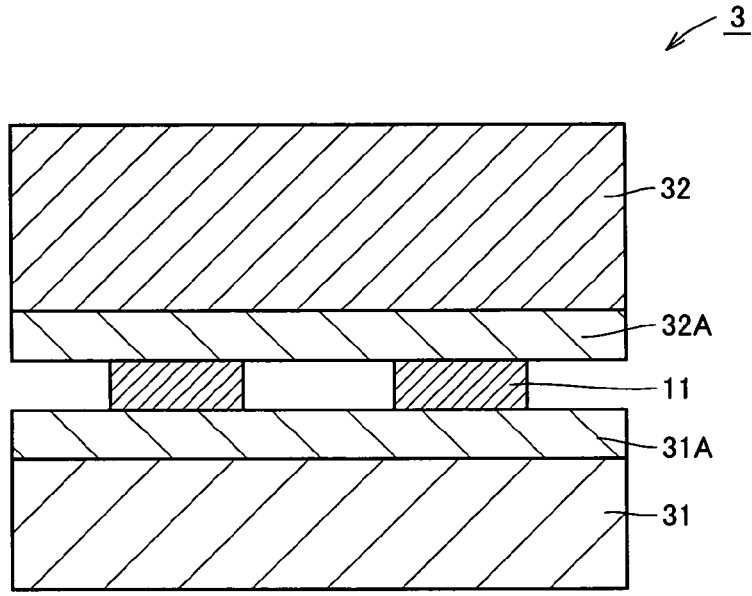
FIG. 4 is a schematic cross-sectional view showing a mold-constraining cooling apparatus included in the manufacturing facility for steel members in FIG. 2.

The above-described manufacturing facility for the steel member includes the high-frequency induction heating apparatus for quenching purpose that is the induction heating apparatus for quenching purpose and includes the mold-constraining cooling apparatus that are hereinafter described in detail with reference to FIGS. 3 and 4. High-frequency induction heating apparatus for quenching purpose 2 shown in FIG. 3 has a quenching rotary table 21 made for example of a material having thermal insulation and electrical insulation properties (e.g. ceramic material) as well as a quenching induction coil 22. Further, quenching rotary table 21 has a protrusion 21A for setting washer 11 thereon. Mold-constraining cooling apparatus 3 shown in FIG. 4 has lower constraining mold 31 and upper constraining mold 32 and is structured to allow a press weight or hydraulic cylinder for example to apply downward load from above upper constraining mold 32.

Next, the procedure for the quench-hardening is described. As shown in FIG. 3, washer 11 as formed is set to contact the top of projection 21A of quenching rotary table 21. Then, high-frequency current is applied through quenching induction coil 22 to induction-heat washer 11. At this time, for evenly heating washer 11, washer 11 is rotated by rotations of quenching rotary table 21. Through the induction heating, washer 11 is heated to the temperature of $A_{c1}$ point or higher and held for a predetermined time period.

Thereafter, washer 11 is sandwiched between directly adjacent lower constraining mold 31 and upper constraining mold 32 of mold-constraining cooling apparatus 3, and a press weight is put on upper constraining mold 32. Accordingly, while washer 11 is constrained by lower constraining mold 31 and upper constraining mold 32, heat is removed from washer 11 by lower constraining mold 3 1 and upper constraining mold 32 which serve as a cooling member, so that washer. 11 is rapidly cooled to the temperature of $M_s$ point or lower.

Here, since washer 11 has a thickness of at most 3 mm and has a small thermal capacity, washer 11 can be quickly cooled to a sufficient degree by allowing washer 11 to contact lower constraining mold 31 and upper constraining mold 32, without using such a cooling medium as oil or water.

In the case where washer 11 is quench-hardened that is for example made of the material SAE1070 and has an inner diameter of 60 mm, an outer diameter of 85 mm and a thickness of 1 mm, the process conditions are preferably that the heating temperature is 900° C. to 1050° C., the heating time is 0.5 sec to 5 sec, the constraining (pressing) pressure is at least 11.7 kPa, and the constraining time is at least 2 sec. Still preferably, the material for upper-constraining-mold constraining unit 32A of upper constraining mold 32 and lower-constraining-mold constraining unit. 31A of lower constraining mold 31 are made for example of a material having hardness equivalent to or higher than that of washer 11 as quench-hardened, for preventing surface damage to upper-constraining-mold constraining unit 32A and lower-constraining-mold constraining unit 31A. The material is preferably for example quench-hardened bearing steel, carbon steel or stainless steel. Moreover, the material for lower constraining mold 31 and upper constraining mold 32 preferably has high thermal conductivity and high rust resistance. For generating the pressing pressure, in addition to a normally-used weight, any mechanism generating such a pressure as air pressure or hydraulic pressure can be used.

In addition, it is necessary that lower constraining mold 31 and upper constraining mold 32 greatly differ in thermal capacity from washer 11 to be quench-hardened. Specifically, the volume of lower constraining mold 31 and upper constraining mold 32 is preferably at least 50 times as large as the volume of washer 11. It is noted that a cooling apparatus including a cooling medium flowing apparatus that flows such a cooling medium as water in a mold can be used to decrease the required volume ratio between lower constraining mold 31 and upper constraining mold 32 each and washer 11 to be quench-hardened, and accordingly mold-constraining cooling apparatus 3 can be reduced in size. Alternatively, a cooling apparatus including a member of supplying a cooling gas for blowing such a gas as air to and thereby cooling lower constraining mold 31 and upper constraining mold 32 can be used to achieve an effect similar to the above-described one. In this case, the air blow can be used to remove dust for example attached to lower constraining mold 31 and upper constraining mold 32.

Further, preferably lower-constraining-mold constraining unit 31A and upper-constraining-mold constraining unit 32A have a high degree of precision since the precision of these components influences the precision of washer 11 to be quench-hardened. In other words, preferably these components have smaller warp and undulation and smaller surface roughness (the finish level after the bearing is ground).

Furthermore, although the heating step and the cooling step included in the quench-hardening step can be performed in an air atmosphere, preferably these steps are performed in an oxidation-suppressing atmosphere, for example an atmosphere of such a gas as nitrogen having low reactivity.

Usually, in the case where washer 11 is manufactured under the above-described conditions, the washer having a surface layer hardness of 730 HV and a warp of 30 μm or less can be manufactured if the tempering temperature is 150° C. or lower. In the present embodiment, for all washers 11, the hardness measurement and the appearance test are conducted after the quenching and after the tempering. Therefore, washer 11 whose quality is stable and strictly guaranteed and accordingly whose reliability is extremely high, as well as thin thrust bearing 1 having this washer can be manufactured. Moreover, since the data concerning the results of the measurement of the hardness and the results of the appearance test can be obtained for all washers 11, the data can statistically be processed to easily find any cause for defective washer 11, if found, and accordingly improve the reliability of the manufacturing process itself for washers 11.

In addition, in most cases, the conventional process keeps, in a storage container for example, washer 11 after formed and before quench-hardened, as an in-process workpiece. Since washer 11 that has not been quench-hardened is low in hardness, washers 11 contacting each other while being transported or handled could result in deep flaws. Especially for thin washer 11, since the subsequently performed grinding step reduces the thickness by a relatively small extent in most cases, the flaws could remain even if further subsequent process steps are normally performed, and thus the resultant washer could be regarded as a defective product. In the present embodiment, since the process from the forming to the post-tempering test of washer 11 can be carried out without leaving in-process workpieces, there is no possibility of occurrence of such a flaw. Thus, not only the high reliability of the product but also reduction of the number of washers 11 discarded as defective products can be achieved, which contributes to reduction of manufacturing cost. Further, since the front and rear sides of the steel plate are different from each other in surface state, preferably respective front sides or respective rear sides of all washers 11 are oriented identically for making the product quality stable. If washers 11 as formed are stored as in-process workpieces in a storage container for example as done in the conventional process, it is extremely difficult to manage the orientation of washers 11. In contrast, in the present embodiment that does not generate in-process workpieces, the orientation of washers 11 can be managed relatively easily until at least the post-tempering test is completed. Accordingly, the quality of washers 11 can be stabilized.

In connection with the present embodiment, the case is described where washer 11 which is a steel member is moved by a moving apparatus from each of such apparatuses as high-frequency induction heating apparatus for quenching purpose 2 and mold-constraining cooling apparatus 3 to the following apparatus. The manufacturing facility for the steel member of the present invention, however, is not limited to such a case. For example, the present invention may be implemented in the manner where a part or all of the apparatuses included in the manufacturing facility are structured to be movable and thus the apparatuses each move to the steel member to be processed, so as to perform such process steps as heating and cooling.

Further, in connection with the present embodiment, the case is described where high-frequency induction heating apparatus for quenching purpose 2 and high-frequency induction heating apparatus for tempering purpose 7 are separately provided. However, the manufacturing facility may be structured to allow high-frequency induction heating apparatus for quenching purpose 2 to serve as the high-frequency induction heating apparatus for tempering purpose 7.

Furthermore, in connection with the present embodiment, the case is described where ultrasonic hardness tester 5 and image processing apparatus 6 for the hardness measurement and the appearance test after the quenching and before the tempering and those for the hardness measurement and the appearance test after the tempering are separately provided. The manufacturing facility, however, may be structured to allow the devices for the hardness measurement and the appearance test after the quenching and before the tempering to serve as the devices for the hardness measurement and the appearance test after the tempering.

The manufacturing facility for the steel member according to the present invention is advantageously applicable especially to the manufacturing facility for the steel member including the quench-hardening apparatus and the tempering apparatus. Moreover, the thin bearing-member and the thrust bearing according to the present invention are advantageously applicable especially to a thin bearing-member that is manufactured using the above-described manufacturing apparatus as well as to the thrust bearing having this thin bearing-member as a washer.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A steel-member manufacturing facility, comprising:
a die-cutting apparatus die-cutting a steel plate to form a steel member;
a quench-hardening apparatus heating said steel member formed by means of said die-cutting apparatus to a temperature of at least $A_{c1}$ point and thereafter cooling said steel member to a temperature of at most $M_s$ point so as to quench-harden said steel member; and
a tempering apparatus heating said steel member quench-hardened by means of said quench-hardening apparatus to a temperature of at most $A_{c1}$ point so as to temper said steel member, wherein said quench-hardening apparatus includes:
an induction heating apparatus for quenching purpose, using induction-heating for heating said steel member formed by means of said die-cutting apparatus to the temperature of at least $A_{c1}$ point;
a mold-constraining cooling apparatus, while using a mold for constraining said steel member heated to the temperature of at least $A_{c1}$ point by means of said induction-heating apparatus for quenching purpose, using said mold as a cooling member for removing heat from said steel member, so as to cool said steel member to the temperature of at most $M_s$ point; and
an automatic material-property testing apparatus automatically testing a material property of said steel member at at least one of a point in time after tempering is performed by said tempering apparatus and a point in time after quench-hardening is performed by said quench-hardening apparatus and before said tempering is performed,
wherein said tempering apparatus includes a heating apparatus for tempering purpose, heating said steel member that is quench-hardened by means of said quench-hardening apparatus to the temperature of at most $A_{c1}$ point,
the quench-hardening apparatus does not use oil or water as a cooling medium for cooling the steel member, and
said die-cutting apparatus, said quench-hardening apparatus and said tempering apparatus are placed at the same general area in said steel-member manufacturing facility.

2. The steel-member manufacturing facility according to claim 1, further comprising an automatic appearance testing apparatus automatically testing appearance of said steel member at at least one of a point in time after tempering is performed by said tempering apparatus and a point in time after quench-hardening is performed by said quench-hardening apparatus and before said tempering is performed.

3. The steel-member manufacturing facility according to claim 1, further comprising:
a cleaning apparatus cleaning said steel member, formed by said die-cutting apparatus, before said heating is performed by said induction heating apparatus for quenching purpose, so as to remove an attached matter attached to a surface of said steel member; and
a drying apparatus drying said steel member, before said heating is performed by said induction heating apparatus for quenching purpose, so as to remove a cleaning fluid attached to said steel member while said cleaning apparatus performs cleaning.

* * * * *